United States Patent [19]

Almond

[11] 4,204,355
[45] May 27, 1980

[54] AUTOMATIC FISH CATCHER

[76] Inventor: William C. Almond, 28 Valley Dr., Little Rock, Ariz. 72209

[21] Appl. No.: 2,505

[22] Filed: Jan. 11, 1979

[51] Int. Cl.² ............................................. A01K 69/00
[52] U.S. Cl. ........................................................ 43/15
[58] Field of Search ..................................... 43/15, 16

[56] References Cited
U.S. PATENT DOCUMENTS

| | | | |
|---|---|---|---|
| 76,489 | 4/1868 | McCaughan | 43/15 |
| 2,714,270 | 8/1955 | Premo | 43/15 |
| 3,394,484 | 7/1968 | Sonoski | 43/16 |
| 3,798,821 | 3/1974 | Bybee | 43/15 |
| 4,034,418 | 7/1977 | Ikarimoto | 43/15 |
| 4,043,069 | 8/1977 | Zahner | 43/15 |

Primary Examiner—Nicholas P. Godici

[57] ABSTRACT

A fish catcher effective for automatically lifting a hooked fish, or a readily visible portion thereof, out of water has a fishing line attached at one end to a weight, the fishing line extending upwardly from the weight, along a horizontal fishing line guide, and then downwardly to a fishhook termination. The weight is slidably movable from its mounting by action of a hooked fish, and the size of the weight is such that at least a visible portion of a hooked fish is lifted above the surface of the water as the weight falls. The preferred embodiment integrates mounting bracket elements enabling removable attachment of the catcher to an upstanding support, and the weight is preferably a heavy metal spool about which fishing line may be wound and fastened.

8 Claims, 6 Drawing Figures

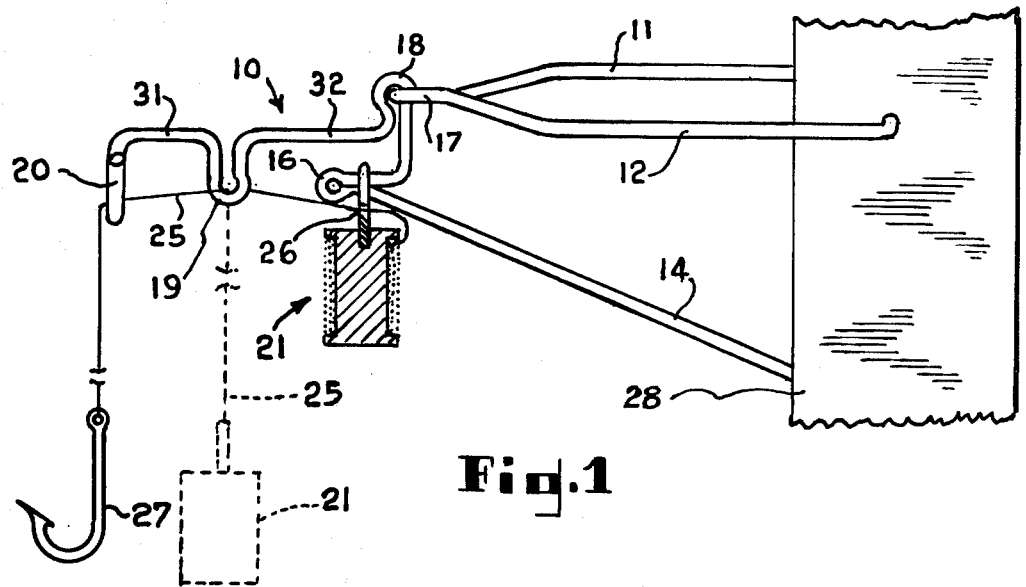
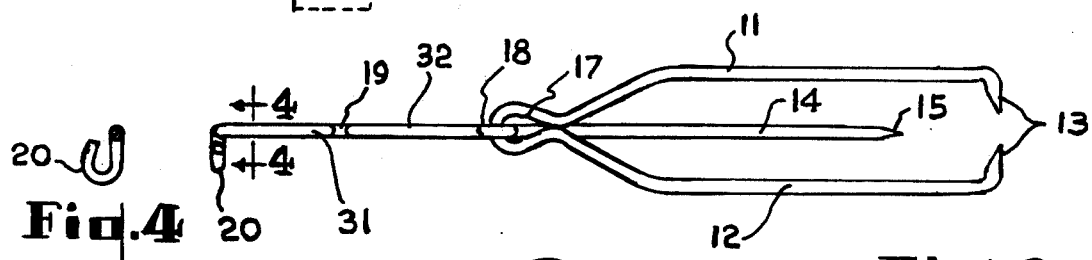
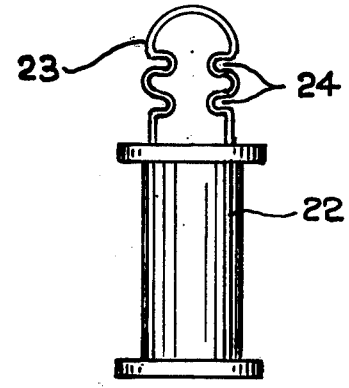

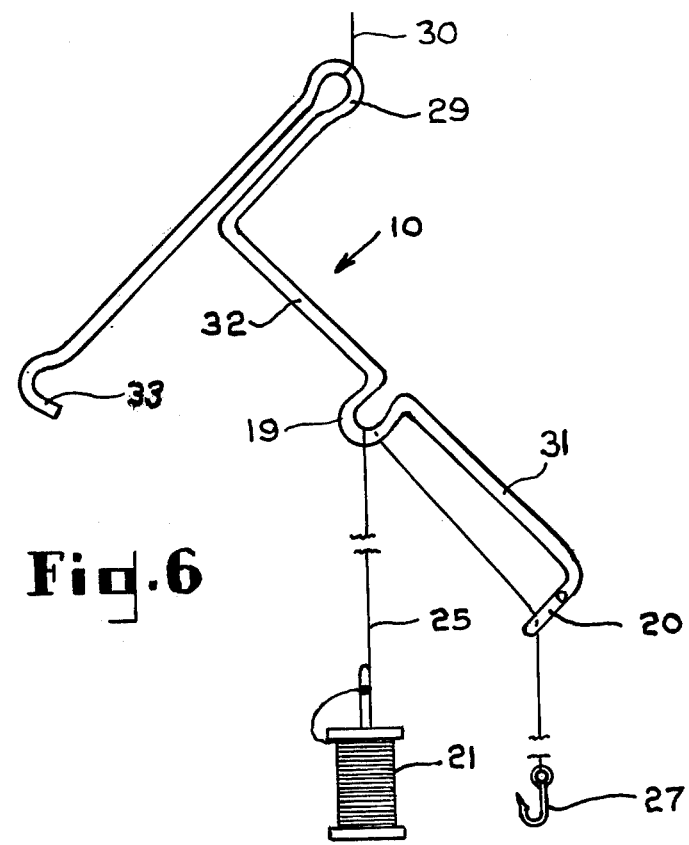

AUTOMATIC FISH CATCHER

BACKGROUND OF THE INVENTION

Fishing gear described in the prior art includes hook-setting devices, fish-actuated signals used in through-ice fishing and numerous pole holders and actuators. These structures generally require some sort of spring mechanism, either as a principal source of energy or as auxiliary triggering element. One well known and widely used fish catcher functions in a manner similar to that of a common window shade roller, the stored energy of a spring being released by a jerky movement of an associated line.

Except for certain hook-setting devices, which are not intended or suitable for lifting a hooked fish automatically from a submerged position in water, relatively few weight-actuated fish catchers appear in the prior art, and none are believed available in which elements of an embodied mounting bracket also function as elements of the fish catching mechanism.

SUMMARY OF THE INVENTION

An elongate horizontally extending fishing line guide has a weight slidably movable from a horizontally disposed mounting at one end of the guide, the weight being configured as a spool about which a fishing line may be wound. The fishing line is fastened to the weight, extending therefrom first upwardly, thence through a series of downwardly extending partially open eyes and finally downwardly to a fishhook termination.

The invention as illustrated at FIGS. 1 through 4 has a tripodal mounting including an upper resilient bifurcated member for clasping an upstanding support and a compression brace portion sloping downwardly from the closed end of the bifurcated member. A portion of the brace portion is folded along a horizontal line to define a weight-receiving protuberance, and another coextensive portion integral with the compression brace extends outward from the bifurcated member to complete the fishing line guide above described.

BRIEF DESCRIPTION OF THE DRAWING

FIG. 1 is a perspective view of the invention, in which the spool-shaped weight is shown in section and the dashed lines indicate the position assumed by the weight after being pulled from its mounting;

FIG. 2 is a plan view of the invention, shown in a relaxed condition and without either the fishing line or the spool-shaped weight;

FIG. 3 is a side elevational view of the spool-shaped weight;

FIG. 4 is a sectional view of the fishing line guide, taken along the line 4—4 of FIG. 2;

FIG. 5 is a side elevational view of the pendently supported embodiment of the invention, in position for operation; and FIG. 6 is a similar view, showing the position assumed following release of the weight by the action of a fish hooked on the fishing line.

DESCRIPTION OF THE PREFERRED EMBODIMENT

FIG. 1 of the drawing shows in solid lines the fish catcher elements in the operating position while attached to and extending outwardly from an upstanding support 28, and FIG. 2 shows in plan the fish catcher without the fishing line and associated elements.

The legs 11 and 12 are tension members of an upper bifurcated member extending from the outer eye 17 rearwardly in spaced coextensive relationship, the legs terminating in a pair of opposed inwardly turned prong points 13.

A compression brace 14, having the pointed tip 15, extends upwardly and outwardly from the support 28. A coextensive looped portion of the brace 14 is folded to define a horizontally extending weight-receiving protuberance 16, the brace 14 also extending upwardly from the protuberance 16 to the eye 18, the latter encircling and cooperating with the eye 17 of the upper bifurcated member.

A fishing line guide 10 includes, in common with the brace 14, the horizontally directed protuberance 16 and the portion extending upwardly therefrom through the eye portion 18, and in addition, the horizontal coextensive portion 32, the downwardly directed partially open eye 19, the horizontal coextensive portion 31 and the downwardly directed partially open eye 20.

The fish catcher is a weight-actuated device, the numeral 21 referring to a spool-shaped weight of heavy metal, upon which is wound a portion of the fishing line 25. FIG. 3 shows the weight without fishing line, the spool 22 being fixedly secured to the inverted, generally U-shaped bail 23 for use in pendently supporting the weight. A plurality of inwardly directed loop portions 24 along the vertical legs of the bail 23 provide an anchoring structure about which the fishing line may be snubbed, as indicated at the numeral 26, for the purpose of facilitating the fastening of the fishing line to the weight.

The weight 21 is pendently hung upon the horizontal weight-receiving protuberance 16, from which it is movable by forwardly sliding therefrom. The fishing line 25 extends forwardly through the eyes 19 and 20, and thence downward to its termination at the fishhook 27.

In operation, the tugging action of a fish caught upon the fishhook 27 is transmitted through the fishing line to the weight 21, slidably moving the weight from its mounting. It is desired that at least a readily visible portion of the hooked fish be pulled upwardly by the falling weight to an elevation above the associated water level.

The weight utilized to indicate the occurrence of a hooked fish may, if desired, be much smaller than that required for bodily lifting the fish completely above the water, since only a relatively small unsubmerged portion of the fish is needed as an indicator. Also, the volume of the weight may be minimized by the use of a heavy metal having a specific gravity of 5 or greater.

In the embodiment shown at FIGS. 5 and 6, a suspension mounting has been substituted for the mounting bracket elements. A portion of the fishing line guide 10 extends upwardly from the rearward end to provide the eye 29, for the purpose of suspending the fish catcher, as by the cord 30, from an overhead support (not shown). The weight 21 rests on a horizontal weight-receiving portion 33, located at the lower end of a coextensive portion extending downwardly from the rearward end of the fishing line guide 10. This embodiment operates under the same conditions and in the same manner as above described in connection with the bracket type of fish catcher.

What is claimed is:

1. A weight-actuated fish catcher having tripodal mounting for removable outstanding attachment to an upstanding support;
   said tripodal mounting means including a downwardly sloping compression leg;
   said leg extending outwardly beyond said mounting means to define a fishing line guide having therealong a plurality of downwardly extending partially open eye portions;
   a weight-receiving protuberance integral with said compression leg;
   a weight resting on said protuberance and slidably removable therefrom;
   a length of fishing line attached at one end to said weight and passing longitudinally through said eye portions; and
   a fishhook at the other end of said fishing line.

2. The fish catcher claimed in claim 1, in which said weight is pendently mounted on said weight-receiving protuberance.

3. The fish catcher claimed in claim 1, wherein said weight is spool-shaped and a portion of fishing line is wound thereon.

4. The fish catcher claimed in claim 1, wherein said weight includes an inverted generally U-shaped bail fixedly secured thereto and extending upwardly therefrom.

5. The fish catcher claimed in claim 1, wherein said weight includes an inverted generally U-shaped bail fixedly secured thereto and extending upwardly therefrom, said bail having at least one inwardly directed loop portion along a leg of said U-shaped bail.

6. The fish catcher claimed in claim 1, wherein the material of said weight is a heavy metal having a specific gravity of not less than 5.0.

7. A fish catcher removably attachable to a support comprising:
   an upper bifurcated member, the bifurcations of which extend rearwardly from a first partially open eye at the forward end of the member to define a pair of spatially adjacent parallel coextensive tension leg portions, the rearward end portions of said leg portions terminating in a pair of spaced coplanar inwardly turned opposed prong portions;
   an elongate second member having a second intermediately positioned partially open eye cooperating with said first eye to provide a pivotal mounting thereon about which said second member is swingable in a plane passing vertically between said bifurcations;
   said second member including a fishing line guide having downwardly directed and forwardly extending portions coextensive with said second eye;
   the forwardly extending portion having a partially open outer eye at the outer end thereof and an intermediate partially open eye rearwardly spaced from said outer eye, and said downwardly directed portion having thereon an integral folded forwardly extending weight-receiving protuberance,
   a portion of said second member extending rearwardly and downwardly from said protuberance and terminating at a pointed tip for engaging a support;
   a weight resting removably on said protuberance and slidably removable therefrom, and a fishing line attached to said weight and extending therefrom along said fishing line guide.

8. In a weight-actuated fish catcher:
   a fishing line guide comprising an elongate rod having a horizontally disposed segment;
   an outer end partially open eye positioned at the outer end of said horizontally disposed segment and an intermediate partially open eye rearwardly spaced from said outer end eye;
   the eyes extending downwardly from said horizontally disposed segment and being so positioned that the axes of said eyes are normal to one another;
   a vertically disposed segment coextensive with said horizontally disposed segment;
   a coextensive horizontally disposed protuberance at the lower end of said vertically disposed segment;
   a slidably removable weight resting upon said protuberance;
   a fishing line attached to said weight and sequentially threaded therefrom through said intermediate eye and said outer eye; and
   a fishhook at the unattached end of said fishing line.

* * * * *